(12) United States Patent
Lee et al.

(10) Patent No.: US 10,415,117 B2
(45) Date of Patent: Sep. 17, 2019

(54) METHOD FOR RECOVERING VANADIUM AND TUNGSTEN FROM LEACH SOLUTION OF WASTE DENITRIFICATION CATALYST

(71) Applicant: KOREA INSTITUTE OF GEOSCIENCE AND MINERAL RESOURCES, Daejeon (KR)

(72) Inventors: Jin-Young Lee, Daejeon (KR); Rajesh Kumar, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 519 days.

(21) Appl. No.: 15/125,114

(22) PCT Filed: Feb. 27, 2015

(86) PCT No.: PCT/KR2015/001942
§ 371 (c)(1),
(2) Date: Sep. 9, 2016

(87) PCT Pub. No.: WO2015/137653
PCT Pub. Date: Sep. 17, 2015

(65) Prior Publication Data
US 2016/0376682 A1 Dec. 29, 2016

(30) Foreign Application Priority Data
Mar. 11, 2014 (KR) .................... 10-2014-0028508

(51) Int. Cl.
*C22B 34/36* (2006.01)
*C22B 3/12* (2006.01)
(Continued)

(52) U.S. Cl.
CPC .............. *C22B 34/365* (2013.01); *C22B 3/12* (2013.01); *C22B 3/44* (2013.01); *C22B 7/009* (2013.01);
(Continued)

(58) Field of Classification Search
CPC .. C22B 3/12; C22B 3/44; C22B 7/009; C22B 34/365; C22B 34/225; Y02P 10/234; Y02P 10/23
See application file for complete search history.

(56) References Cited

U.S. PATENT DOCUMENTS 4,298,582 A * 11/1981 Menashi ................ C01G 31/00
423/138

FOREIGN PATENT DOCUMENTS

| CN | 101921916 | * 12/2010 | ............... C22B 7/00 |
| CN | 101921916 A | 12/2010 | |

(Continued)

OTHER PUBLICATIONS

Li, He et al. *Thermodynamic study for precipitating vanadium with calcium salt*, Rare Metals and Hard Alloys, pp. 15-19, vol. 42, No. 1, Feb. 2014.

(Continued)

*Primary Examiner* — Daniel C. McCracken
(74) *Attorney, Agent, or Firm* — Lewis Roca Rothgerber Christie LLP

(57) ABSTRACT

The present invention relates to a method for recovering vanadium and tungsten from a leach solution of a waste denitrification catalyst, and more specifically, to a method for recovering vanadium and tungsten from a leach solution of a waste denitrification catalyst comprising the steps of: recovering vanadium by adding acid and then adding a calcium compound to a leach solution of a waste denitrification catalyst to precipitate the vanadium; and recovering (Continued)

tungsten by adding acid and then adding a calcium compound to the remaining leach solution after recovering the vanadium to precipitate the tungsten.

11 Claims, 3 Drawing Sheets

(51) Int. Cl.
*C22B 3/44* (2006.01)
*C22B 34/22* (2006.01)
*C22B 7/00* (2006.01)

(52) U.S. Cl.
CPC ............. *C22B 34/225* (2013.01); *Y02P 10/23* (2015.11); *Y02P 10/234* (2015.11)

(56) References Cited

FOREIGN PATENT DOCUMENTS

| | | |
|---|---|---|
| JP | 7-300316 | 11/1995 |
| JP | 2011-47013 | 3/2011 |
| KR | 2003-0083558 | 10/2003 |
| KR | 2003-0089401 | 11/2003 |

OTHER PUBLICATIONS

Chinese Office action with English translation for Patent Application No. 201580013012, dated Apr. 28, 2017, 17 pages.

* cited by examiner

[FIG. 1]
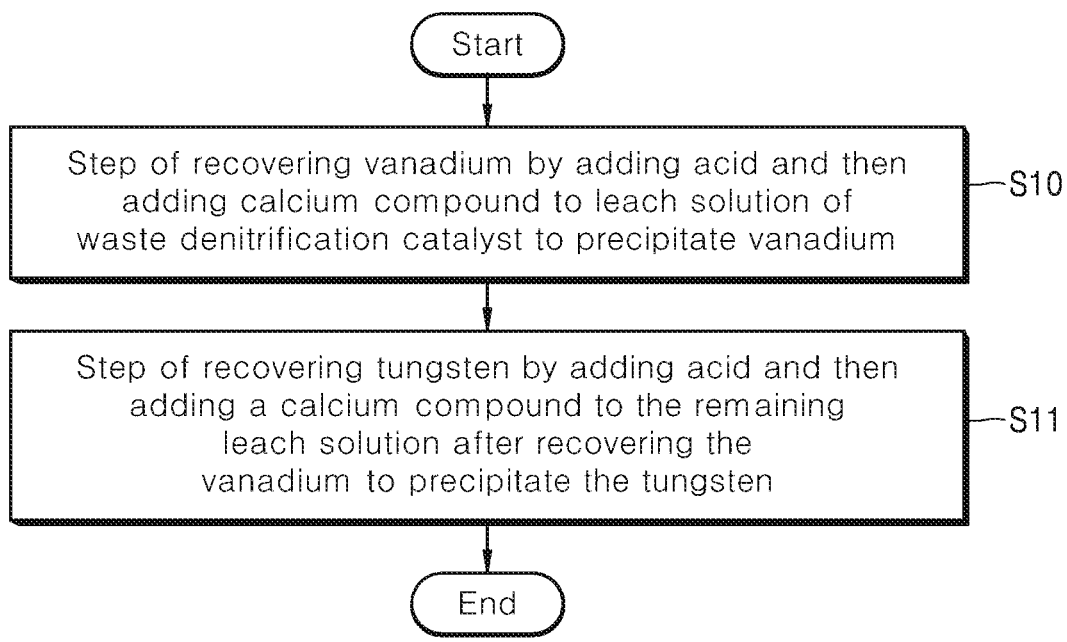

[FIG. 2]
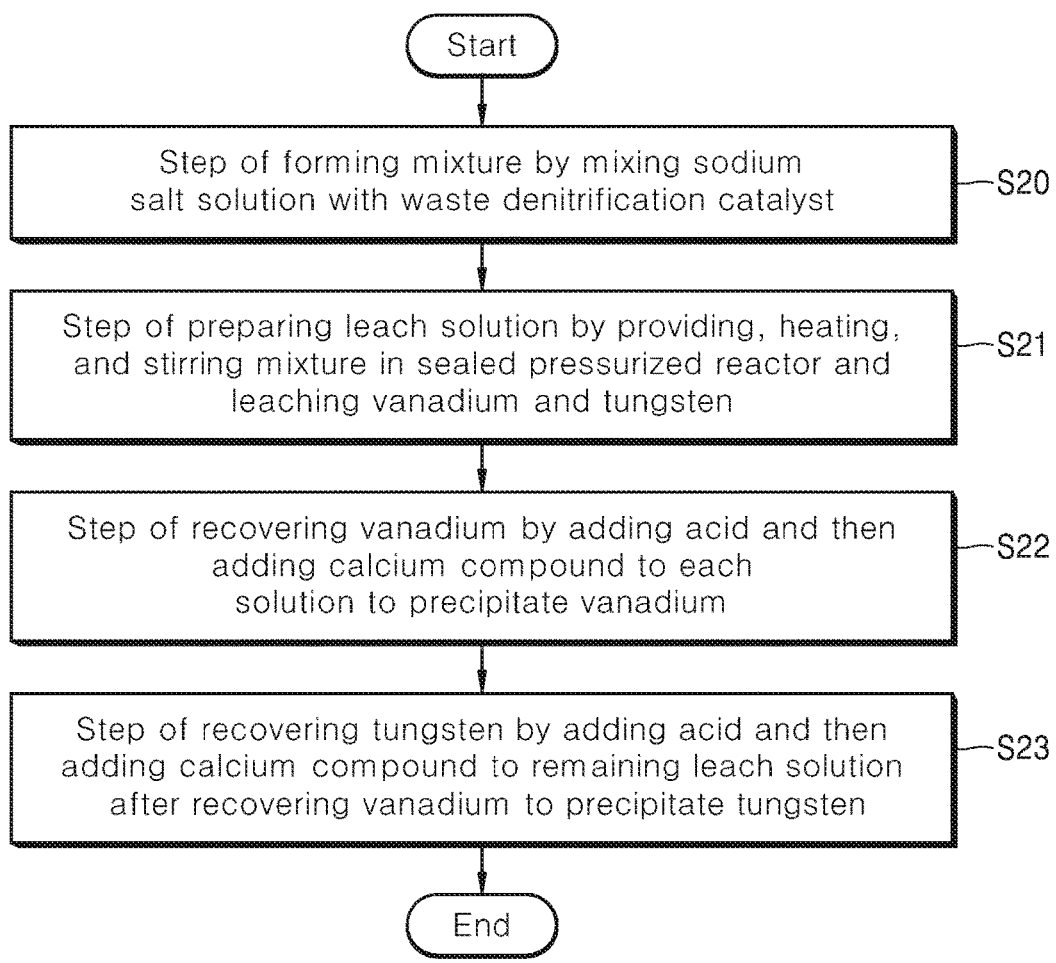

[FIG. 3]
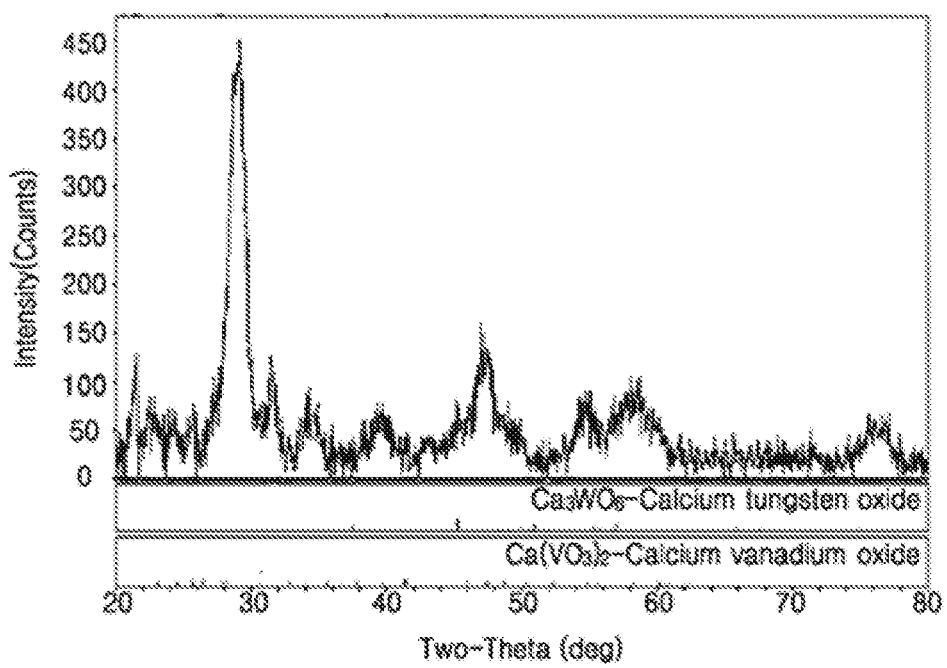
[FIG. 4]
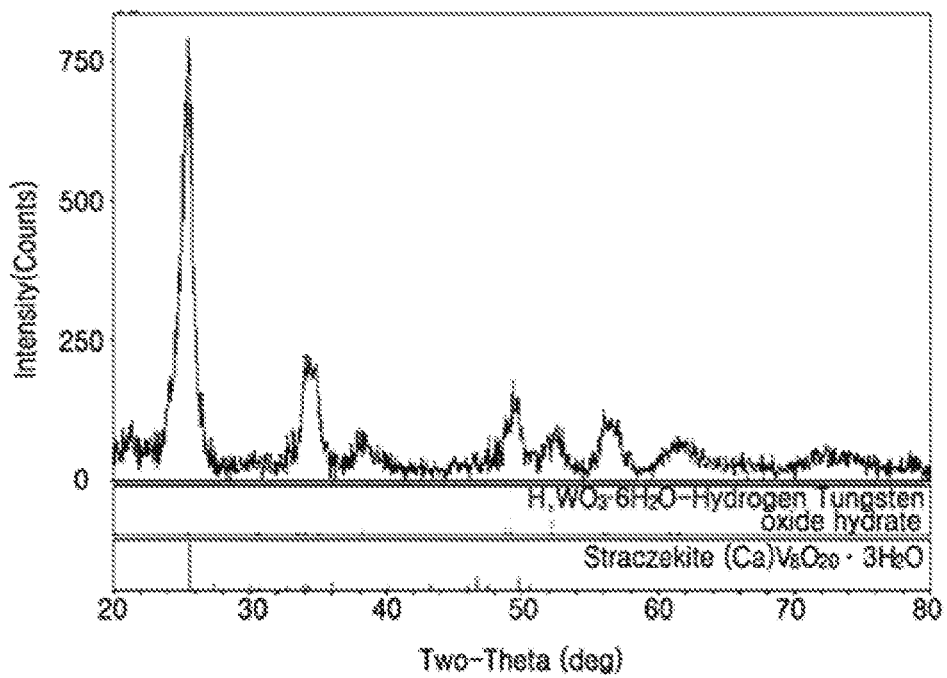

METHOD FOR RECOVERING VANADIUM AND TUNGSTEN FROM LEACH SOLUTION OF WASTE DENITRIFICATION CATALYST

CROSS-REFERENCED TO RELATED APPLICATION(S)

This Application is a National Phase Patent Application and claims priority to and the benefit of International Application Number PCT/KR2015/001942, filed on Feb. 27, 2015, which claims priority to and the benefit of Korean Application 10-2014-0028508, filed Mar. 11, 2014, the entire contents of all of which are incorporated herein by reference.

TECHNICAL FIELD

The present invention relates to a method for recovering vanadium and tungsten from a leach solution of a waste denitrification catalyst.

BACKGROUND ART

In exhaust gas discharged from a cogeneration plant, a coal-fire thermal power plant, a heavy-oil plant, and the like, generally, harmful substances such as hydrogen chloride, sulfur oxides, $NO_x$ and dioxins are contained in large amounts. As a method of specifically removing $NO_x$ among the harmful substances, a selective catalytic reduction method (SCR) with excellent removal efficiency, selectivity, and economy has been widely applied. In an SCR process, for removing $NO_R$, a reductant such as $NH_3$, urea, hydrocarbon and the like is used and $NO_x$ is reduced to harmless gas such as $N_2$ or $H_2O$ by using the reductant on the catalyst. In the SCR process, a $V_2O_5$—$WO_3$/$TiO_2$ catalyst has been widely used and is prepared by mixing additives such as a small amount of $V_2O_5$ as a main active component of the catalyst, $WO_3$ for increasing stabilization and durability of the catalytic activity, and $SiO_2$ for mechanical stability of the catalyst while using $TiO_2$ as a carrier.

Meanwhile, even in most of $NO_x$ emission facilities such as a cogeneration plant, a coal-fire thermal power plant, and a heavy-oil plant in the domestic contrary as well as advanced countries, the SCR process for reducing $NO_x$ is already installed or being installed. The lifespan of the catalyst used in the SCR process of using ammonia as a reductant slightly varies depending on an environment in which the catalyst is operated at respective workplaces, but is approximately 3 to 5 years. Only a few years ago, expired waste denitrification catalyst with significantly deteriorated activity was classified as a specific waste and was embedded. However, considering the economic feasibility of the valuable metals included in the waste denitrification catalyst, a roasting with soda process or an alkali no-pressure leaching process was developed and a method of recycling the waste catalyst as a method of recovering the valuable metals included in the waste denitrification catalyst is being developed.

However, a method of recovering vanadium and tungsten which are leached in the roasting with soda process or the alkali no-pressure leaching process for recovering the valuable metals is required, and a method capable of efficiently recovering vanadium and tungsten with a high recovery rate is required.

As a prior art related with this, Korean Patent Application Publication No. 10-2003-0089401 (published on Nov. 21, 2003) discloses a method for separating and recovering vanadium, tungsten, and titanium from a waste denitrification catalyst.

SUMMARY OF INVENTION

Technical Problem

An object of the present invention is to provide a method for recovering vanadium and tungsten from a leach solution of a waste denitrification catalyst with high recovering rate.

The objects of the present invention are not limited to the aforementioned object(s), and other objects, which are not mentioned above, will be apparent to a person having ordinary skill in the art from the following description.

Solution to Problem

An object of the present invention is to provide a method for recovering vanadium and tungsten from a leach solution of a waste denitrification catalyst with high recovering rate.

The objects of the present invention are not limited to the aforementioned object(s), and other objects, which are not mentioned above, will be apparent to a person having ordinary skill in the art from the following description.

According to an aspect of the present invention, a method for recovering vanadium and tungsten from a leach solution of a waste denitrification catalyst, the method includes the steps of: recovering vanadium by adding acid and then adding a calcium compound to a leach solution of a waste denitrification catalyst to precipitate the vanadium; and recovering tungsten by adding acid and then adding a calcium compound to the remaining leach solution after recovering the vanadium to precipitate the tungsten.

Preferably, the acid may be at least one selected from a group consisting of hydrochloric acid, nitric acid, and sulfuric acid.

Preferably, pH may be adjusted to 12 to 13 by adding the acid to the leach solution of the waste denitrification catalyst.

Preferably, the calcium compound may be at least one selected from a group consisting of $CaCl_2$ and $Ca(OH)_2$, and the calcium compound may be added with an equivalent of 9 to 11 times larger than an equivalent of vanadium when precipitating the vanadium.

Preferably, the pH may be adjusted to greater than or equal to 10 and less than 12 by adding the acid to the remaining leach solution after recovering the vanadium.

Preferably, the calcium compound may be added with an equivalent of 2 to 3 times larger than an equivalent of tungsten when precipitating the tungsten.

Preferably, the vanadium and the tungsten may be precipitated as $Ca(VO_3)_2$ and $CaWO_4$, respectively.

Preferably, the method may further include adding the tungsten to a hydrochloric acid solution after recovering, thereby increasing purity of the tungsten.

According to another aspect of the present invention, a method for recovering vanadium and tungsten contained in a waste denitrification catalyst, the method includes the steps of: forming a mixture by mixing a sodium salt solution with the waste denitrification catalyst; preparing a leach solution by providing, heating, and stirring the mixture in a sealed pressurized reactor and leaching vanadium and tungsten contained in the mixture; recovering the vanadium by adding acid to the leach solution to lower the leach solution's pH and then adding a calcium compound to precipitate the vanadium; and recovering tungsten by adding acid to the remaining leach solution after recovering the vanadium to lower the pH and then adding the calcium compound to precipitate the tungsten.

Preferably, the sodium salt may be at least one selected from a group consisting of sodium hydroxide (NaOH), sodium carbonate ($Na_2CO_3$), and sodium chlorate ($NaClO_3$).

Preferably, the heating temperature may be 225 to 250° C.

Advantageous Effect(s) of Invention

As described above, according to the present invention, by a simple method of adjusting pH and using a calcium compound, it is possible to selectively recover vanadium and tungsten, recover 90% or greater of the vanadium, and recover 97% or greater of the tungsten from a solution leached in a leaching process such as a roasting with soda process, an alkali no-pressure leaching process, or an alkali pressure leaching process.

BRIEF DESCRIPTION OF DRAWING(S)

FIG. 1 is a flowchart illustrating a method for recovering vanadium and tungsten from a leach solution of a waste denitrification catalyst according to the present invention.

FIG. 2 is a flowchart illustrating a method for recovering vanadium and tungsten contained in a waste denitrification catalyst according to the present invention.

FIG. 3 is an XRD analysis result of the vanadium which is recovered by the method for recovering vanadium and tungsten from the leach solution of the waste denitrification catalyst according to the present invention.

FIG. 4 is an XRD analysis result after the tungsten which is recovered by the method for recovering vanadium and tungsten from the leach solution of the waste denitrification catalyst according to the present invention is treated with hydrochloric acid.

DESCRIPTION OF EMBODIMENT(S)

Hereinafter, exemplary embodiments of the present invention will be described in detail with reference to the accompanying drawings.

Various advantages and features of the present invention and methods accomplishing thereof will become apparent from the following description of exemplary embodiments with reference to the accompanying drawings.

However, the present invention is not limited to the following embodiments but may be implemented in various different forms. The embodiments are provided only to complete disclosure of the present invention and to fully provide a person having ordinary skill in the art to which the present invention pertains with the category of the disclosure, and the present invention will be defined by the appended claims.

Further, in the description of the present invention, when it is determined that the gist of the present invention can be blurred by the related known arts, the detailed description thereof will be omitted.

The present invention provides a method for recovering vanadium and tungsten from a leach solution of a waste denitrification catalyst, the method comprising the steps of: recovering vanadium by adding acid and then adding a calcium compound to a leach solution of a waste denitrification catalyst to precipitate the vanadium; and recovering tungsten by adding acid and then adding a calcium compound to the remaining leach solution after recovering the vanadium to precipitate the tungsten.

The method for recovering the vanadium and the tungsten from the leach solution of the waste denitrification catalyst according to the present invention is a simple method of adjusting pH and using a calcium compound to recover selectively vanadium and tungsten, recover 90% or greater of the vanadium, and recover 97% or greater of the tungsten from a solution leached in a leaching process such as a roasting with soda process, an alkali no-pressure leaching process, or an alkali pressure leaching process. Further, the present invention uses a heating leaching method of mixing the leach solution of the waste denitrification catalyst with a sodium salt solution and heating the mixture in a sealed container to leach 90% or greater of the vanadium and the tungsten contained in the waste denitrification catalyst by a simple process.

FIG. 1 is a flowchart illustrating a method for recovering vanadium and tungsten from a leach solution of a waste denitrification catalyst according to the present invention. Hereinafter, the present invention will be described in detail with reference to FIG. 1.

The method for recovering vanadium and tungsten from the leach solution of the waste denitrification catalyst according to the present invention includes recovering vanadium by adding acid to the leach solution of the waste denitrification catalyst and then adding a calcium compound to precipitate the vanadium (S10).

In the method for recovering vanadium and tungsten from the leach solution of the waste denitrification catalyst according to the present invention, the waste denitrification catalyst is $V_2O_5$—$WO_3$/$TiO_2$ which is mainly used in a selective catalytic reduction process, and while using $TiO_2$ as a carrier, additives such as a small amount of $V_2O_5$(1 to 3 wt %) as a main active component of the catalyst, $WO_3$ (7 to 10 wt %) for increasing stabilization and durability of the catalytic activity, and $SiO_2$ for mechanical stability of the catalyst are mixed. As a method of leaching a valuable metal contained in the waste denitrification catalyst, there is a roasting with soda process, a no-pressure leaching process, or a pressure leaching process and the like. The recovering method according to the present invention is not limited to the aforementioned leaching process and any solution that leaches the valuable metal from the waste denitrification catalyst may be applied.

In the method for recovering vanadium and tungsten from the leach solution of the waste denitrification catalyst according to the present invention, the acid may use at least one selected from a group consisting of hydrochloric acid, nitric acid, and sulfuric acid. The pH of the leach solution of the waste denitrification catalyst may be adjusted to 12 to 13 by adding the acid to the leach solution with the pH which is increased to 14 due to the leaching process. When the pH is less than 12, the precipitation rate of the vanadium is less than 90%, the precipitation rate of the tungsten is increased, and thus there is a problem in that the vanadium and the tungsten may not be selectively recovered. When the pH is greater than 13, there is a problem in that the precipitation rate of the vanadium is decreased. That is, when the pH is greater than 13, the production rate of hydroxide such as $Ca(OH)_2$ is larger than the production rate of $Ca(VO_3)_2$ and thus the vanadium may not be precipitated. In an area having less than pH 12, the tungsten is precipitated and thus the tungsten as well as the vanadium are precipitated and cannot be selectively separated and recovered.

The calcium compound may use at least one selected from a group consisting of $CaCl_2$ and $Ca(OH)_2$.

Further, the calcium compound may be added with an equivalent of 9 to 11 times larger than an equivalent of the vanadium when precipitating the vanadium. When the calcium compound is added with an equivalent less than 9 times the vanadium equivalent, there is a problem of the precipitation rate of the vanadium decreasing. When the calcium compound is added with an equivalent greater than 11 times the vanadium equivalent, an excess amount of calcium compound that is more than the amount of vanadium in the leach solution is added and thus there is a problem of the content of impurities in the leach solution increasing.

The vanadium is precipitated in a form of $Ca(VO_3)_2$ and may be recovered from the leach solution by performing a filtering process as illustrated in Reaction Formula 1 below.

$$2NaVO_3 + CaCl_2 \rightarrow Ca(VO_3)_2\downarrow + 2NaCl \quad \text{[Reaction Formula 1]}$$

Next, the method for recovering vanadium and tungsten from the leach solution of the waste denitrification catalyst according to the present invention includes after recovering the vanadium, recovering tungsten by adding acid and then adding a calcium compound to the remaining leach solution, to precipitate the tungsten (S11).

The pH of the remaining leach solution may be decreased, by adding acid such as hydrochloric acid, nitric acid, and sulfuric acid to the remaining leach solution after recovering the vanadium. The pH of the leach solution may be adjusted to greater than or equal to 10 and less than 12. When the pH is less than 10, an excess of acid must have been added for decreasing the pH, and thus process costs are increased and process stability is decreased. When the pH is 12 or greater, the precipitation rate of the tungsten is decreased.

Further, the calcium compound may be added with an equivalent of 2 to 3 times larger than an equivalent of tungsten when precipitating the tungsten. When the calcium compound is added with an equivalent less than 2 times the equivalent of tungsten, there is a problem of the precipitation rate of the tungsten decreasing. When the calcium compound is added with an equivalent greater than 3 times the tungsten equivalent, an excess amount of calcium compound that is more than the amount of tungsten in the leach solution is added and thus there is a problem of the content of impurities in the leach solution increasing.

The tungsten is precipitated in a form of $CaWO_4$ in the leach solution as illustrated in Reaction Formula 2 below.

$$Na_2WO_4 + CaCl_2 \rightarrow CaWO_4\downarrow + 2NaCl \quad \text{[Reaction Formula 2]}$$

Further, the method for recovering the vanadium and the tungsten from the leach solution of the waste denitrification catalyst may further include adding the tungsten to a hydrochloric acid solution after recovering (see Reaction Formula 3 below) to increase the purity of the tungsten to 99.5% and other impurities may be eluted and removed in a hydrochloric acid solution. In the case, the concentration of the hydrochloric acid solution may be 5 M.

$$CaWO_4(s) + 2HCl \rightarrow H_2WO_4(s) + CaCl_2 \quad \text{[Reaction Formula 3]}$$

Meanwhile, the recovered $H_2WO_4$ is dissolved in ammonia water and then may form ammonium paratungstate (APT) like Reaction Formula 4 below by an evaporation method.

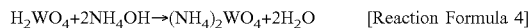
$$H_2WO_4 + 2NH_4OH \rightarrow (NH_4)_2WO_4 + 2H_2O \quad \text{[Reaction Formula 4]}$$

Further, the present invention provides a method for recovering vanadium and tungsten contained in a waste denitrification catalyst, the method comprising the steps of: forming a mixture by mixing a sodium salt solution with the waste denitrification catalyst (S20);

preparing a leach solution by a providing, heating, and stirring the mixture in a sealed pressurized reactor and leaching vanadium and tungsten contained in the mixture (S21);

recovering the vanadium by adding acid to the leach solution to lower the leach solution's pH and then adding a calcium compound to precipitate the vanadium (S22); and recovering tungsten by adding acid to the remaining leach solution after recovering the vanadium to lower the pH and then adding the calcium compound to precipitate the tungsten (S23).

FIG. 2 is a flowchart illustrating a method for recovering vanadium and tungsten contained in a waste denitrification catalyst according to the present invention. In the method for recovering the vanadium and the tungsten contained in the waste denitrification catalyst according to the present invention, in order to obtain the leach solution of the waste denitrification catalyst, as described above, a roasting with soda process, an alkali no-pressure leaching process, or the like may be performed. However, the step of forming a mixture by mixing a sodium salt solution with the waste denitrification catalyst (S20) and preparing a leach solution by providing, heating, and stirring the mixture in a sealed pressurized reactor and leaching vanadium and tungsten contained in the mixture (S21) are performed. Thus, a lower heating temperature is used compared to the roasting with soda process, which decreases the process cost, and 90% or greater of the vanadium and the tungsten may be leached by a simpler method than the no-pressure leaching process.

The sodium salt may be at least one selected from a group consisting of sodium hydroxide (NaOH), sodium carbonate ($Na_2CO_3$), and sodium chlorate ($NaClO_3$).

Further, the heating temperature may be 225 to 250° C. When the heating temperature is less than 225° C., there is a problem in that the leaching rate of the vanadium is high, but the leaching rate of the tungsten is low, and when the heating temperature is greater than 250° C., the leaching rate of the vanadium and the tungsten are not increased at all and thus the heating temperature may be 250° C. or less. In a pressurized reactor sealed due to the heating process, pressure of 20 to 80 atm is formed and thus the reaction velocity of the valuable metal contained in the waste denitrification catalyst and the sodium salt solution is increased and the leaching rate of the vanadium and the tungsten which are the valuable metals contained in the waste denitrification catalyst is increased.

Example 1

Recovery 1 of Vanadium and Tungsten from Leach Solution of Waste Denitrification Catalyst HCl was added in 1 L of a leach solution of a waste denitrification catalyst having a composition in Table 1 below, the pH of the leach solution was adjusted to 13, $CaCl_2$ was added 10 times as much as the vanadium equivalent, and vanadium was precipitated as $Ca(VO_3)_2$ and filtered to recover the vanadium. The pH of the leach solution was lowered to 11 by adding HCl in the remaining leach solution after recovering the vanadium, $CaCl_2$ was added 2 times as much as the tungsten equivalent, the tungsten was precipitated as $CaWO_4$ and filtered to recover the tungsten.

Table 1 below illustrates components and contents of the leach solution which is generally leached by the alkali no-pressure leaching process.

TABLE 1

| | Component | | | | | |
|---|---|---|---|---|---|---|
| | V | W | Al | Ti | Ca | Si |
| Content (ppm) | 532 | 6130 | <2.0 | 3.0 | <2.0 | 1250 |

Example 2

Recovery 2 of Vanadium and Tungsten from Leach Solution of Waste Denitrification Catalyst Except for putting recovered tungsten in a 5M hydrochloric acid solution to be converted to $H_2WO_4$ for a high purification of the recovered tungsten $CaWO_4$, the vanadium and the tungsten were recovered by the same method as Example 1.

Example 3

Recovery of Vanadium and Tungsten from Waste Denitrification Catalyst 100 g of a waste denitrification catalyst discharged in the Samcheok thermal power generation station was mixed with 1 L of 2.0 M NaOH solution to get a solid-liquid ration of 10%. The mixture of the waste denitrification catalyst and the NaOH solution was provided in a 1 L-grade pressurized reactor and then the pressurized reactor was completely sealed. The sealed pressurized reactor was heated at 225° C., stirred at 1000 rpm, and leached for 2 hrs.

HCl was added in 1 L of the leach solution of the waste denitrification catalyst, the pH of the leach solution was adjusted to 13, $CaCl_2$ was added 10 times as much as the vanadium equivalent, and the vanadium was precipitated as $Ca(VO_3)_2$ and filtered to recover the vanadium. The pH of the leach solution was lowered to 12 or less by adding HCl to the remaining leach solution after recovering the vanadium, $CaCl_2$ was added 2 times as much as the tungsten equivalent, the tungsten was precipitated as $CaWO_4$ and filtered to recover the tungsten.

Experimental Example 1

Analysis of Precipitation Rate of Vanadium and Tungsten According to pH of Leach Solution In the method for recovering vanadium and tungsten from the leach solution of the waste denitrification catalyst according to the present invention, the precipitation rates of vanadium and tungsten according to the pH of the leach solution of the waste denitrification catalyst were analyzed and then the result was illustrated in Table 2.

TABLE 2

| pH | 13.5 | 13 | 12.5 | 12 |
|---|---|---|---|---|
| V precipitation rate (%) | 60 | 94 | 82 | 47 |
| W precipitation rate (%) | 0.8 | 2.3 | 5.8 | 12 |

As illustrated in Table 2, when the pH of the leach solution of the waste denitrification catalyst was 13, the precipitation rate of the vanadium was highest as 94%, 60% at pH 13.5, and 82% at pH 12.5. Meanwhile, the precipitation rate of the tungsten increased as the pH decreased, the pH of the remaining leach solution after recovering the vanadium was lowered to 10 or 11, and the tungsten may be precipitated at approximately 97.7%.

Experimental Example 2

Analysis of Crystal Structures of Recovered Vanadium and Tungsten

Crystal structures of the vanadium and the tungsten which are recovered by the method for recovering vanadium and tungsten from the leach solution of the waste denitrification catalyst according to the present invention were analyzed and the result thereof was illustrated in FIGS. 3 and 4.

FIG. 3 is an XRD analysis result of the vanadium which is recovered by the method for recovering vanadium and tungsten from the leach solution of the waste denitrification catalyst according to the present invention. As illustrated in FIG. 3, the recovered vanadium was observed as $Ca(VO_3)_2$.

FIG. 4 is an XRD analysis result after the tungsten which is recovered by the method for recovering vanadium and tungsten from the leach solution of the waste denitrification catalyst according to the present invention is treated with hydrochloric acid. As illustrated in FIG. 4, the recovered tungsten was $CaWO_4$, but was recovered as a powder of $H_2WO_4$ after reacting with hydrochloric acid.

As described above, the detailed exemplary embodiments for the method for recovering vanadium and tungsten from a leach solution of a waste denitrification catalyst according to the present invention are described, but it is apparent that various modifications can be implemented without departing from the scope of the present invention.

Therefore, the scope of the present invention should not be limited to the exemplary embodiment and should be defined by the appended claims and equivalents to the appended claims.

That is, it should be understood that the aforementioned exemplary embodiments are described for illustration in all aspects and are not limited, and it should be construed that the scope of the present invention is represented by the claims to be described below other than the detailed description, and all of the changes or modified forms induced from the meaning and the scope of the claims, and an equivalent concept thereof are included in the scope of the present invention.

The invention claimed is:

1. A method for recovering vanadium and tungsten from a leach solution of a waste denitrification catalyst, the method comprising the steps of:
    recovering vanadium by adding acid and then adding a calcium compound to a leach solution of a waste denitrification catalyst to precipitate the vanadium; and
    recovering tungsten by adding acid and then adding a calcium compound to the remaining leach solution after recovering the vanadium to precipitate the tungsten,
    wherein pH is adjusted to greater than or equal to 10 and less than 12 by adding the acid to the remaining leach solution after recovering the vanadium.

2. The method of claim 1, wherein the acid is at least one selected from a group consisting of hydrochloric acid, nitric acid, and sulfuric acid.

3. The method of claim 1, wherein pH is adjusted to 12 to 13 by adding the acid to the leach solution of the waste denitrification catalyst.

4. The method of claim 1, wherein the calcium compound is at least one selected from a group consisting of $CaCl_2$ and $Ca(OH)_2$.

5. The method of claim 1, wherein the calcium compound is added with an equivalent of 9 to 11 times larger than an equivalent of vanadium when precipitating the vanadium.

6. The method of claim 1, wherein the calcium compound is added with an equivalent of 2 to 3 times larger than an equivalent of tungsten when precipitating the tungsten.

7. The method of claim 1, wherein the vanadium and the tungsten are precipitated as $Ca(VO_3)_2$ and $CaWO_4$, respectively.

8. The method of claim 1, further comprising:
adding the tungsten to a hydrochloric acid solution after recovering.

9. A method for recovering vanadium and tungsten contained in a waste denitrification catalyst, the method comprising the steps of:
forming a mixture by mixing a sodium salt solution with the waste denitrification catalyst;
preparing a leach solution by providing, heating, and stirring the mixture in a sealed pressurized reactor and leaching vanadium and tungsten contained in the mixture;
recovering the vanadium by adding acid to the leach solution to lower the leach solution's pH and then adding a calcium compound to precipitate the vanadium; and
recovering tungsten by adding acid to the remaining leach solution after recovering the vanadium to lower the pH and then adding the calcium compound to precipitate the tungsten,
wherein pH is adjusted to greater than or equal to 10 and less than 12 by adding the acid to the remaining leach solution after recovering the vanadium.

10. The method of claim 9, wherein the sodium salt is at least one selected from a group consisting of sodium hydroxide (NaOH), sodium carbonate ($Na_2CO_3$), and sodium chlorate ($NaClO_3$).

11. The method of claim 9, wherein the heating temperature is 225 to 250° C.

* * * * *